United States Patent Office 2,759,959
Patented Aug. 21, 1956

2,759,959
ALLYLPHENYL ORGANOSILANES

Kurt C. Frisch, Huntingdon Valley, Pa., assignor to General Electric Company, a corporation of New York No Drawing. Application April 23, 1953,
Serial No. 350,749

2 Claims. (Cl. 260—448.2)

This invention is concerned with novel organosilicon compositions. More particularly, the invention relates to unsaturated aromatic silanes having the general formula

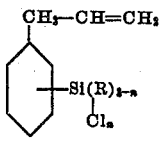

where R is a monovalent hydrocarbon radical and $n$ is a whole number equal to from 0 to 2, inclusive.

Among the values for R are, for instance, alkyl radicals (e. g., methyl, ethyl, propyl, isopropyl, butyl, decyl, etc.), aryl radicals (e. g., phenyl, naphthyl, biphenyl, etc.), aralkyl radicals (e. g., benzyl, phenylethyl, etc.), alkaryl radicals (e. g., tolyl, xylyl, ethylphenyl, etc.), cycloaliphatic radicals (e. g., cyclohexyl, cyclopentyl, cyclohexenyl, etc.), as well as monovalent hydrocarbon radicals containing inert substituents thereon as, for instance, halogens such as chlorine, bromine, fluorine, etc.

The compounds herein disclosed and claimed may advantageously be prepared by effecting reaction between a Grignard reagent of the general formula

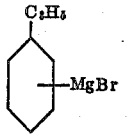

and an organosilane of the formula $$(R)_{4-m}SiCl_m$$

where $m$ is an integer equal to from 1 to 3.

The Grignard reagent having the formula

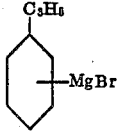

may be prepared by reacting, for instance, bromoallyl benzene of the formula

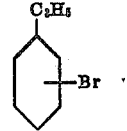

with magnesium employing the usual procedures used to make Grignard reagents. The latter Grignard reagent can then be reacted with the organochlorosilane to form the desired allyl aromatic silane.

In order that those skilled in the art may better understand how the present invention can be practiced, the following examples are given by way of illustration and not by way of limitation. All parts are by weight.

Example 1

The Grignard reagent p-allylphenyl magnesium bromide having the formula

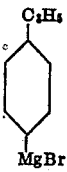

was prepared by effecting reaction between 98.5 parts p-bromoallylbenzene and 12.2 parts magnesium turnings in about 248 parts diethyl ether observing rigid precaution that all the ingredients were substantially devoid of any moisture. Half of the Grignard solution prepared above was added drop-wise to a solution of 27.2 parts trimethylchlorosilane in 71 parts diethyl ether. The mixture was thereafter heated at the reflux temperature of the mass for about 17 hours, and the inorganic precipitate which formed was removed by filtration. The filtrate was distilled to remove solvent and low boiling materials to give a colorless liquid boiling at 123–125° C. at 32 mm. This product was identified as p-allylphenyltrimethylsilane having the formula

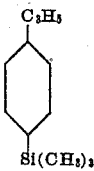

Example 2

The other half of the Grignard solution prepared in Example 1 was added gradually to a solution of 37.4 parts methyltrichlorosilane and 71 parts diethyl ether. The reaction mixture was then heated at the reflux temperature of the mass for about 17 hours, the inorganic precipitate removed by filtration and the filtrate fractionally distilled to give a colorless liquid distilling in the range of 146–155° C. at 32 mm. This product was identified as p-allylphenylmethyl dichlorosilane having the formula

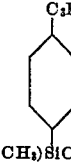

as evidenced by analysis thereof which showed that it contained 11.9 per cent silicon (theoretical 12.1 per cent silicon).

Example 3

The compound p-allylphenyldimethylchlorosilane having the formula

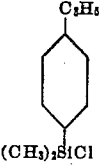

may be prepared in the same manner as described in Example 2 with the exception that one employs dimethyldichlorosilane in place of the methyltrichlorosilane used in the aforesaid Example 2.

Example 4

Other allylphenyl hydrocarbon-substituted silanes, for instance, p-allylphenyltriphenylsilane, p-allylphenylphenyldichlorosilane having the formula

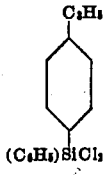

etc. may be prepared similarly as above with the exception that the proper phenylchlorosilane is employed in place of the methylchlorosilane employed in Examples 1 to 3.

*Example 5*

This example illustrates the preparation of derivatives of the compositions herein described and claimed. More particularly, about 44 parts of p-allylphenylmethyldichlorosilane prepared above in Example 2 was heated at reflux with 39 parts acetic anhydride and a trace of triethanolamine for about 3 hours. The reaction product was then fractionally distilled to obtain a good yield of p-allylphenylmethyldiacetoxysilane as a colorless liquid boiling at about 139–141° C. at 0.1 mm.

The above acetoxy derivative was added slowly to a stirred saturated sodium chloride solution containing an amount of water in excess of that required for complete hydrolysis of the acetoxy groups. After standing for a short period of time, the mixture was extracted with ethyl ether, the ether extract dried over anhydrous sodium sulfate, and thereafter heated on a steam bath to remove the solvent and the residual traces of acetic acid, employing a vacuum in the final operation. The colorless liquid thus obtained was identified by analysis to be a mixture, in approximately equal proportions of p-allylphenylmethylsilanediol having the formula

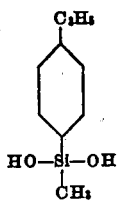

and bis(p-allylphenyl methyl) disiloxanediol having the formula

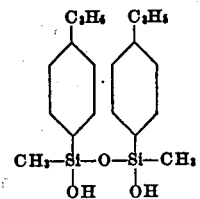

It will, of course, be apparent to those skilled in the art that the grouping

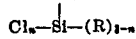

where R and n have the meanings given above, may be attached to other points of the phenyl nucleus. For instance, instead of being in the para position it may be in the ortho or meta positions. Moreover, the type of organic groups positioned around the silicon atom of the claimed compositions may also be varied widely, in accordance with the various values for which R stands. Where more than one R group is on the silicon atom, each R may obviously be a different radical as, for instance, the monovalent hydrocarbon radicals around the silicon atom may consist of methyl and ethyl groups, methyl and phenyl groups, etc. I do not intend to be limited to any particular hydrocarbon group nor to the position on the benzene nucleus to which the silicon atom is attached.

The compositions herein described may be employed for various uses. The allyl phenyl triorganosilanes coming within the scope of the invention may be polymerized by themselves or with other copolymerizable materials such as styrene, methyl methacrylate, diallyl phthalate, etc., using elevated temperatures of the order of about 100–200° C., and polymerization accelerators, such as benzoyl peroxide, tertiary butyl cyclohexyl hydroperoxide, tertiary butyl perbenzoate, etc., employing the catalyst in amounts ranging from 0.1 to 4 percent, by weight, based on the weight of the polymerizable composition. Polymerized products derived from the allyl phenyl triorganosilanes can be used in various applications, for instance, as insulating media for electrical coils, as potting compounds, etc.

The allylphenyl hydrocarbon-substituted chlorosilances, that is, those containing one or more silicon-bonded chlorine atoms can be hydrolyzed with water either by themselves or with other co-hydrolyzable ingredients such as dimethyldichlorosilane, methyltrichlorosilane, phenyltrichlorosilane, etc., to make useful products in the silicone field, as, for example, silicone rubbers, resins, oils, etc. Such silicone materials because of their desirable heat resistance may be employed in coating compositions, for insulating purposes, as molding compounds, particularly in the silicone rubber field from which gaskets and heater ducts having good resistance to elevated temperatures can be processed.

In connection with the above uses, attention is directed to the fact that a compound such as p-allylphenyl methyldichlorosilane can be hydrolyzed to give a polymeric structure having the recurring structural unit

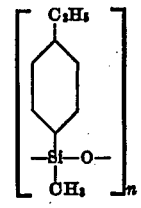

where n is an integer greater than 1. Such particular polymeric materials can be condensed to gums with, for instance, alkali-metal hydroxides, which can then be compounded with various fillers, such as silica aerogel, titanium dioxide, etc., and cured at temperatures of from about 150–200° C. with benzoyl peroxide as a curing agent to give useful commercial articles of manufacture. If desired, prior to condensation of the aforesaid polymeric material, it may be admixed with other organopolysiloxanes, for instance, cyclic dimethyl siloxanes, etc., in varying proportions to give modified silicone rubbers having utility in the molding and insulating arts.

What I claim as new and desire to obtain by Letters Patent of the United States is:

1. The chemical compound p-allylphenlymethyldichlorosilane having the formula

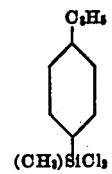

said compound boiling within the range of 146°–155° C. at 32 mm.

2. The method for making p-allylphenylmethyldichlorosilane which comprises (1) adding the Grignard reagent of p-allylphenyl magnesium bromide to methyltrichlorosilane, which is in the form of a diethyl ether solution, (2) heating the reaction mixture to effect reaction between the ingredients, (3) removing the precipitate formed and (4) fractionally distilling the filtrate to give p-allylphenylmethyldichlorosilane boiling within the range of 146°–155° C. at 32 mm.

References Cited in the file of this patent

UNITED STATES PATENTS

| | | |
|---|---|---|
| 2,469,154 | Bunnell et al. | May 3, 1949 |
| 2,642,415 | Winslow | June 16, 1953 |

OTHER REFERENCES

Beilstein: "Handbuch der Org. Chem." (1951), vol. 16, supp. 2, pp. 656, 657.

Rochow: "An Introduction to the Chemistry of the Silicones," 2nd Edition (1952), pp. 34–36, Wiley & Sons, publishers, New York.